Sept. 15, 1942.   H. S. JANDUS   2,295,792
BRAKE LEVER
Filed June 6, 1940   3 Sheets-Sheet 3
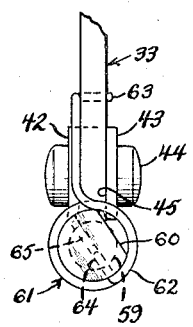
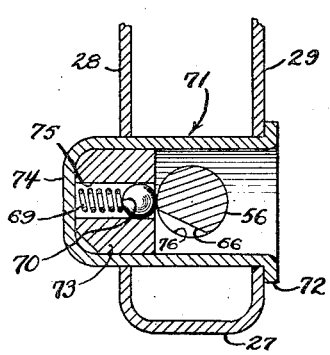
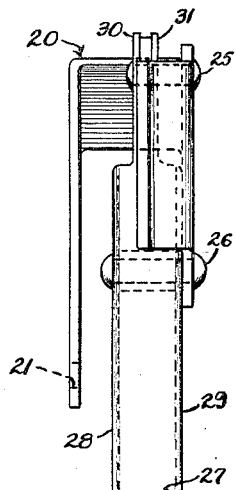
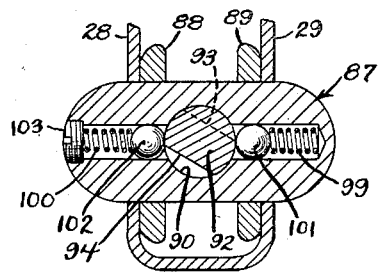
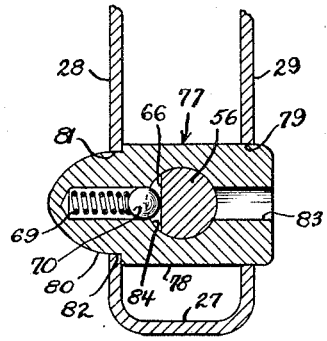
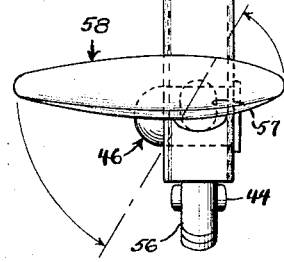
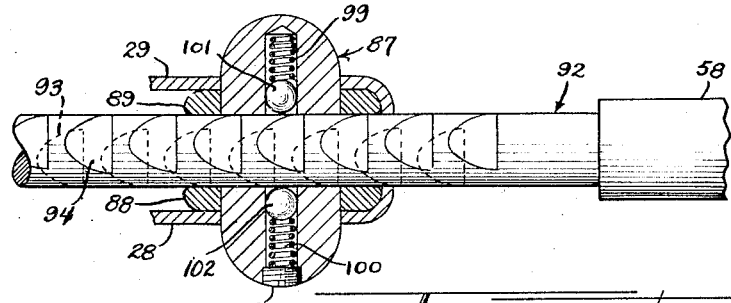
Inventor
Herbert S. Jandus.

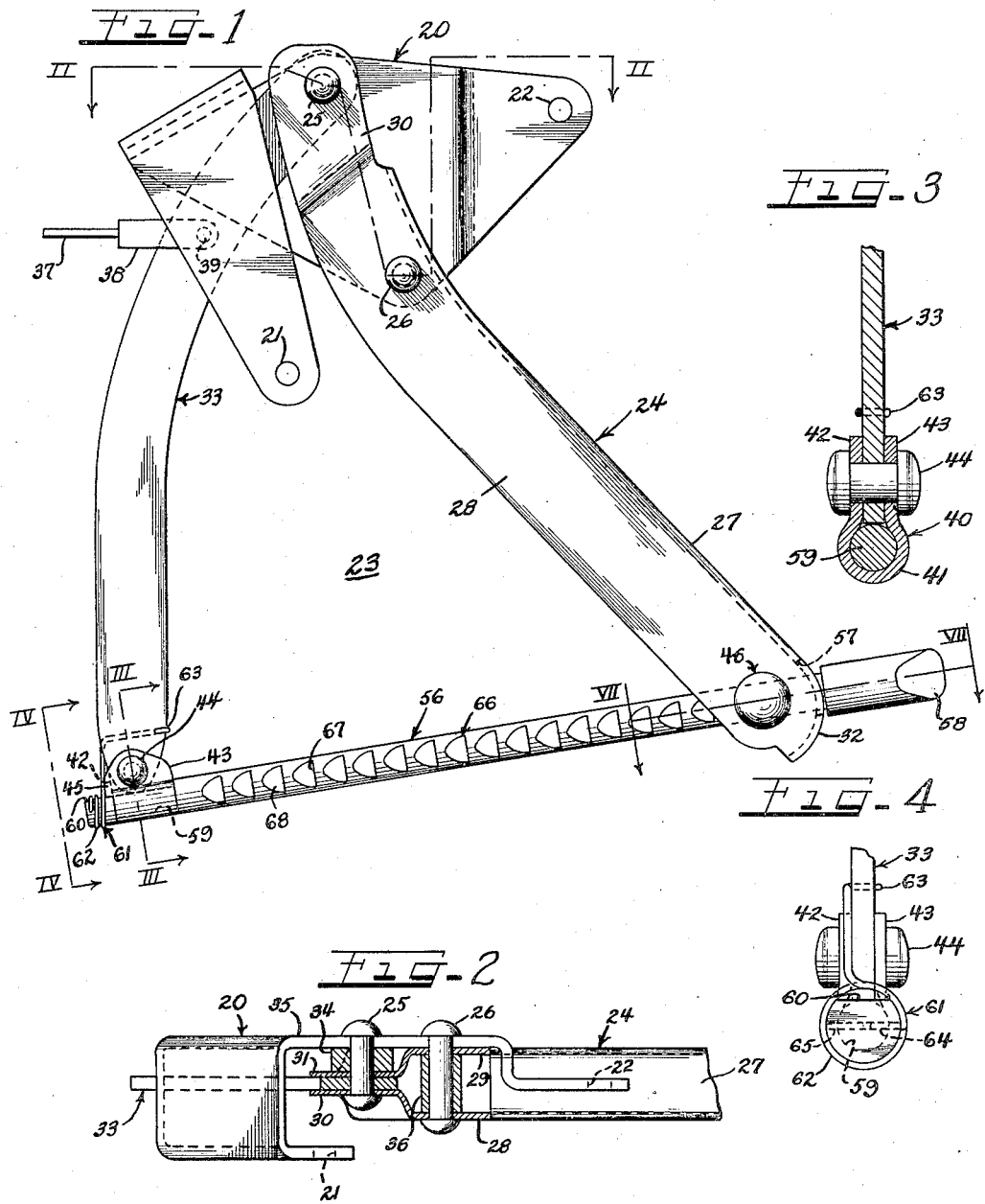

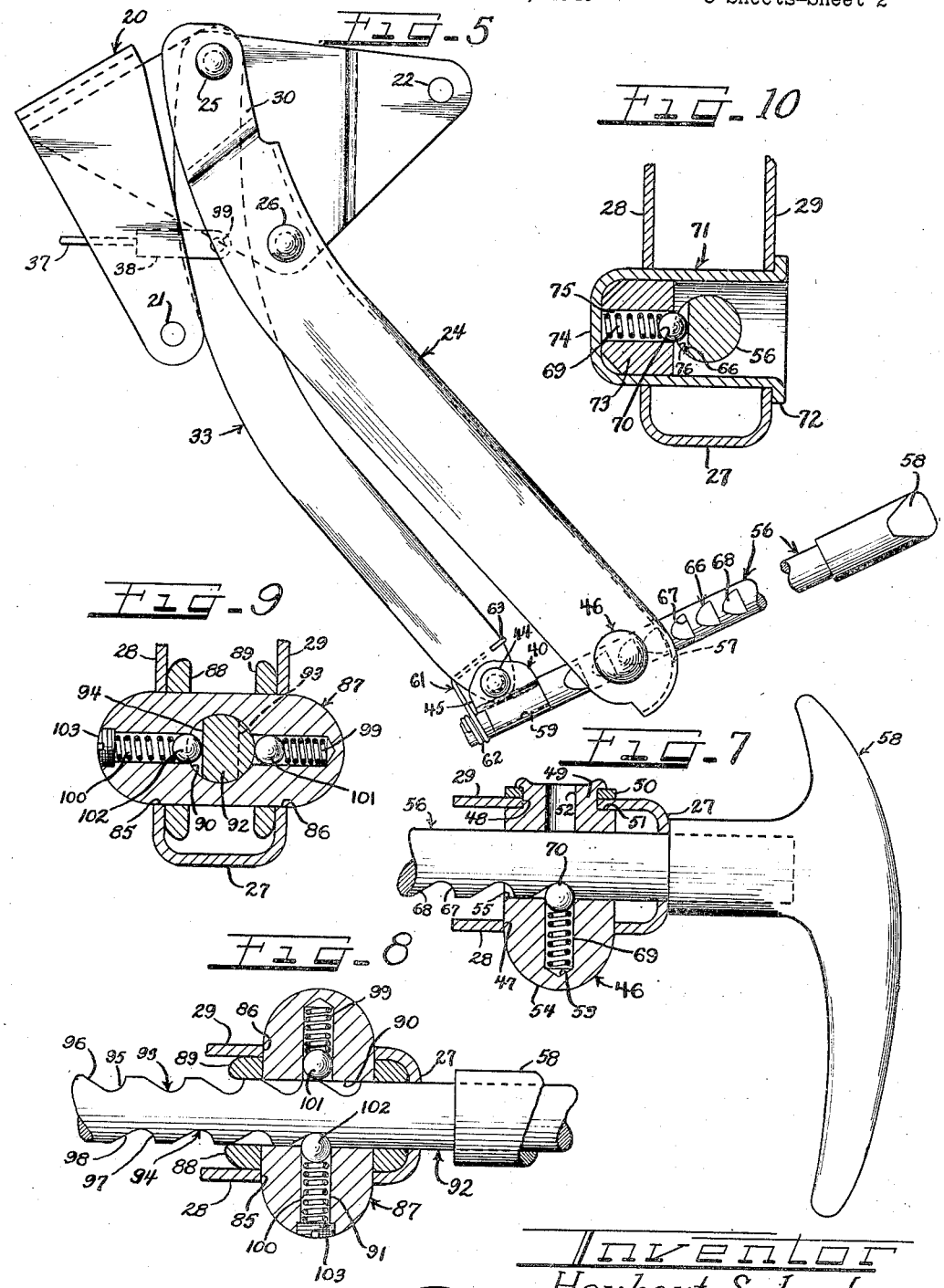

Patented Sept. 15, 1942

2,295,792

UNITED STATES PATENT OFFICE 2,295,792

BRAKE LEVER

Herbert S. Jandus, Detroit, Mich., assignor to Houdaille-Hershey Corporation, Detroit, Mich., a corporation of Michigan Application June 6, 1940, Serial No. 339,069

20 Claims. (Cl. 74—541)

This invention relates to a novel brake lever construction and more particularly to an improved brake-operating device whereby the brakes of an automotive vehicle are set and released by a substantially endwise movable actuating member which is released from an adjusted held position by rotative movement.

An important object of this invention is the provision of a brake lever construction in which a straight-pull type of lever arrangement is adapted to a swinging type of lever.

Another object of the invention is to provide a brake lever construction with an actuating member movable in a substantial endwise direction for applying and releasing brakes, and which is released from an adjusted held position by rotative movement.

A further object of this invention is the provision of a combination straight-pull and swinging type of brake lever construction wherein the actuating member is held in adjusted position by a spring pressed ball ratchet assembly.

A further object of this invention is to provide a combination straight-pull and swinging type of brake lever construction having an actuating member normally arranged to be maintained by spring pressure in a position for being held in an adjusted position to which it is moved and being further arranged for limited rotative movement to release it from its adjusted position.

A further object of this invention is to provide a combination straight-pull and swinging type of brake lever construction having an actuating member with a novel release mechanism.

A still further object of the present invention is to provide a brake operating means which is simple in construction, durable and efficient in use, and which may be readily applied in place.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a side elevational view of a brake lever mechanism constructed in accordance with the principles of the present invention;

Figure 2 is a transverse cross-sectional view, with parts in elevation, taken substantially in the plane indicated by the line II—II of Figure 1;

Figure 3 is an enlarged fragmentary vertical cross-sectional view, with a part in elevation, taken substantially in the plane indicated by the line III—III of Figure 1;

Figure 4 is an enlarged fragmentary end view in elevation, as seen from the left looking in the direction of the arrows, taken substantially in the plane indicated by the line IV—IV of Figure 1;

Figure 5 is a view similar to Figure 1 illustrating the relative position of parts when the actuating member has been moved from a brake-released position to a brake-actuated position;

Figure 6 is an edge elevational view, as seen from the right, of the brake lever mechanism illustrated in Figure 1;

Figure 7 is an enlarged fragmentary transverse cross-sectional view with parts in elevation, taken substantially in the plane indicated by the line VII—VII of Figure 1;

Figure 8 is a view similar to Figure 7 illustrating a modified form of the invention in which a double ball ratchet mechanism is provided;

Figure 9 is a transverse cross-sectional view taken at an angle of approximately 45° through the double ball ratchet mechanism illustrated in Figure 8 and looking in a direction towards the left;

Figure 10 is a view similar to Figure 9, illustrating a modified form of trunnion and a single ball ratchet assembly;

Figure 11 is a view similar to Figure 10 illustrating the relative position of parts when the actuating member has been rotated to a released position;

Figure 12 is a view similar to Figure 4 illustrating the relative position of parts when the actuating member has been rotated to a releasing position as illustrated in Figure 11;

Figure 13 is a view similar to Figure 10 illustrating another modified form of a single ball ratchet trunnion;

Figure 14 is a view similar to Figure 9 illustrating the relative position of parts when the actuating member has been rotated to a releasing position; and, Figure 15 is a view similar to Figure 8 illustrating the relative position of parts when the actuating member has been rotated to a position illustrated in Figure 14.

The brake lever construction herein illustrated is a straight-pull type of lever arrangement adapted to the swinging type of lever. It is to be understood, however, that the actuating lever arrangement of this invention may be adapted for use with any mechanism to be actuated in a swinging or endwise direction. The brake lever construction illustrated herein is similar to the so-called dash-type in that it is adapted to be pivoted behind the instrument board of an automotive vehicle, with the actuating grip portion projecting below and beyond the instrument board.

As particularly illustrated in Figure 1, the brake lever construction of this invention is illustrated as including a mounting plate or bracket 20 of flat metal stamped and shaped to proper size and form for connection to the vehicle (not shown) by means of suitably provided apertures 21 and 22. With the supporting bracket 20 attached to the dash or body portion of the vehicle, the brake lever assembly 23 is suitably supported therefrom for convenient operation by the vehicle operator.

As best shown in Figures 1, 2, 5 and 6, a U-shaped supporting member 24 is connected to in depending relation from the mounting bracket 20 by means of rivets 25 and 26.

As best shown in Figure 2, the supporting member 24 is provided with a web 27 which connects spaced parallel sidewalls 28 and 29. The upper ends of the sidewalls terminate in closely spaced legs 30 and 31, while at the lower end of the supporting member 24 the web 27 terminates in a curved portion 32 (Figure 1).

A flat lever 33 is suitably apertured at its upper end to pivotally hang from the rivet 25 between the spaced legs 30 and 31. A spacing washer 34 is suitably apertured to receive therethrough the rivet 25 to maintain the leg 31 in proper spaced relation from the flat side portion 35 of the mounting bracket 20. An additional spacing washer 36 is apertured to receive therethrough the rivet 26 and for maintaining the spaced relation between the side walls 28 and 29 of the supporting member 24 when connected to the mounting bracket 20.

The braking mechanism of the vehicle (not shown) may be suitably connected to the swinging lever 33 by means of an actuating rod 37 and a clevis 38 which straddles the flat lever and is connected thereto by means of a bolt or rivet 39. Swinging movement of the flat lever 33 about its pivot 25 actuates the braking mechanism through endwise movement of the brake rod 37.

As best shown in Figure 3, a U-shaped bracket 40 provides a rounded portion 41 at its lower end and spaced upstanding legs 42 and 43 which straddle and are connected to the lower end of the lever 33 by means of a headed rivet 44.

It will be noted in Figure 1 that a laterally extending flange portion 45 is provided on the upstanding leg 43 for a purpose to be more fully explained hereinafter.

As shown in Figure 7, the lower end of the supporting member 24 is suitably apertured to receive through the sidewalls 28 and 29 thereof a trunnion member 46. It is to be noted that the aperture 47 in the side wall 28 is larger than the aperture 48 in the side wall 29. The trunnion 46 is circular in cross-section and is provided at one end with a reduced portion 49, having a diameter slightly less than the aperture 48 through which it is inserted. An apertured washer 50, having an inside diameter equal to the aperture 48, embraces the reduced end 49 which is peened or spun over against the washer. This connection serves to maintain the shoulder 51 of the trunnion against the inside face of the sidewall 29 in such a manner as to allow the trunnion to be rotated.

A recess 52 is provided axially of the trunnion 46 and terminates, as at 53, in closely spaced relation from the rounded end 54 of the trunnion. A transversely extending aperture 55 is provided through the trunnion 46 in a manner to bisect the recess 52.

An elongated ratchet rod 56 is inserted through the aperture 55 and an elongated aperture 57 provided in the web 27 of the U-shaped supporting member 24.

Illustrated in Figures 1 and 5, the aperture 57 allows the ratchet rod to tilt angularly in a vertical plane when moved in an endwise direction.

A T-shaped handle 58 is connected to the end of the ratchet rod adjacent the web 27 and abuts thereagainst to limit movement of the ratchet rod to the left.

Adjacent the end of the ratchet rod opposite the handle, there is provided a reduced portion 59 which is embraced by the rounded portion 41 of the bracket 40. As best shown in Figures 4 and 12, a flat surface 60 is provided on the end of the ratchet rod 56, the plane of which is in an extension of the top edge of the reduced portion 59.

A wire spring 61 has one end portion 62 coiled around the end of the ratchet rod 56, upon which is provided the flat surface 60, and its other end 63 formed as a hook engagement with the inside edge of the lever 33. As shown in Figure 4, the coiled end portion 62 of the spring terminates in an inwardly extending hook 64 which is inserted within a recess 65 provided in the end of the ratchet rod 56. The spring normally maintains the ratchet rod in a position in which the flat face 60 is horizontal.

When the handle 58 is rotated in a counter-clockwise direction, the coils 62 of the spring are tightened. When pressure is released from the handle, the coils 62 unwind to return the ratchet rod to its normal position. Rotation of the ratchet rod 56 is limited by engagement between the lateral flange 45 provided on the bracket 40 and the flat face 60 provided on the end of the ratchet rod, as shown in Figure 12. The degree of angularity of this limited rotation is diagrammatically illustrated in Figure 6.

A plurality of socket slots 66 defining ratchet teeth therebetween are provided in a straight line path along an edge of the ratchet rod 56 intermediate its end portions. Each slot (Figure 7) is provided with a semi-circular portion 67 at its forward end and a cam surface 68 sloping upwardly away therefrom and toward the end of the rod opposite the handle.

In the lower portion of the recess 52, closed by insertion of the ratchet rod 56 through the aperture 55, there is inserted a coil spring 69 being seated at the end 53 of the recess and normally urging a ball 70 into engagement with one of the socket slots 66. This engagement between the ball and an adjacent slot allows for endwise movement of the ratchet rod 56 in a direction to the right in which the ball cams along the cam surfaces 68 and the edges of the rod between adjacent teeth. The engagement of the ball and slot, however, prevents endwise movement of the ratchet rod 56 in a direction to the left.

With the brake lever assembly 23 in the position as illustrated in Figure 1, or in a fully brake-released position, the operator merely grasps the handle 58 and pulls it toward him or in a direction to the right. During movement of the ratchet rod 56 in this direction, the spring pressed ball 70 slides along the slanting cam surfaces 68 of the ratchet teeth defined by the slots 66. Tension of the brake-actuating mechanism, as exerted through the actuating rod 37, tends to pull the actuating rod in a reverse direction. This tendency is overcome by engagement of the ball 70 against the rounded surface 67 of one of the slots 66, thereby holding the ratchet rod in adjusted position. To release the ratchet rod, the operator merely rotates the handle 58 in a counter-clockwise direction thereby aligning the spring pressed ball 70 with a smooth surface of the ratchet rod adjacent the toothed path. The parts in this position allow the ratchet rod 56 to be freely reciprocated in either endwise direction.

It is to be noted that the flat lever 33 is swung about its pivot 25 by substantially an endwise push-pull action exerted on the handle 58 of the ratchet rod 56 by the operator. As the ratchet rod moves from its fully brake-released position, Figure 1, to its fully brake-actuated position, Figure 5, the substantial horizontal position of the ratchet rod is changed in an angularly vertical direction which necessitates providing the trunnion 46 for pivotal connection to the side-walls 28 and 29 of the supporting member 24.

Figures 10 and 11 illustrate a modified form of the single ball ratchet assembly previously described. In this modification, the sidewalls 28 and 29 of the supporting member 24 are apertured to receive therethrough a hollow tubular trunnion 71. At its outer edges, the trunnion is provided with an out-turned flange 72 which abuts against the outer surface of the sidewall 29. A circular retainer member 73 is pressed into the hollow trunnion 71 to seat against its bottom portion or end wall 74. An axial aperture 75 is provided through the retainer member 73 to receive therein a coil spring 69.

The trunnion 71 is provided with a transversely extending aperture 76 for receiving therethrough the slotted ratchet rod 56. The ball 70 is urged into seating engagement within an adjacent and aligned socket slot 66 when the ratchet rod is positioned as shown in Figure 10. When, however, the ratchet rod is rotated to a position as shown in Figure 11, the path of the slots 66 is moved out of alignment with the ball 70 which then engages a smooth surface of the ratchet rod adjacent thereto and allows the ratchet rod to be moved freely in either endwise direction.

The trunnion 71 is freely rotatable within the apertures provided in the sidewalls 28 and 29 and is normally prevented from moving in an endwise direction by pressure exerted by the coil spring through the ball 70 against the ratchet rod 56 which maintains the flange 72 in abutment with the sidewall 29.

Another modified form of single ball ratchet assembly is illustrated in Figure 13. In this modification there is provided a trunnion 77 having a round body portion 78 passing through an aperture 79 provided in the sidewall 29 and a reduced end 80 passing through a complemental aperture 81 provided in the sidewall 28. The shoulder 82, provided by the reduced end 80, abuts against the inside surface of the sidewall 28 and is maintained thereagainst by pressure of the coil spring 69 forcing the ball 70 into seated engagement with an adjacent socket slot 66.

In the same manner as previously described, the trunnion 77 is provided with an axially extending recess 83 terminating in closely spaced relation from the reduced end 80 of the trunnion. A transversely extending opening 84 is provided through the trunnion to receive therethrough the ratchet rod 56. The coil spring 69 and the ball 70 are seated within the blind end of the recess 83 to coact with the ratchet rod 56 in the same manner as described with the other trunnion.

In Figures 8, 9, 14 and 15, there is illustrated a double ball ratchet assembly. In this modification, the sidewalls 28 and 29 are provided with the same sized apertures 85 and 86 for receiving therethrough in pivotal relation a round trunnion 87. A pair of apertured washers 88 and 89 are pressed over and around the trunnion 87 and are spaced to abut against the inside surfaces of the side walls 28 and 29 to restrict the trunnion against endwise movement but permitting it to rotate.

The trunnion is provided with a transversely extending opening 90 therethrough and an axial recess 91, which is bisected by the opening 90, terminating in closely spaced relation from one end of the trunnion.

A ratchet rod 92 is inserted through the transversely extending opening 90 provided in the trunnion and terminates at one end in a connected handle 58. The ratchet rod is provided with two diametrically opposite straight line paths of socket slots 93 and 94. It is to be noted that the slots 93 are positioned in staggered relation to the slots 94.

Each slot 93 (Figure 8) is provided with a rounded portion 95 and a slanting cam surface 96 in the same manner as the shape of the previously described slots 66. Likewise, each slot 94 is provided with a rounded portion 97 and a slanting cam surface 98.

It is to be noted that the washers 88 and 89 slidingly engage against the edges of the ratchet rod 92 and against the inside surfaces of the adjacent side walls 28 and 29 of the supporting member 24.

A pair of coil springs 99 and 100 are each positioned within the recess 91 on opposite sides of the ratchet rod. The coil spring 99 urges a ball 101 into engagement with the aligned slots 93, while the coil spring 100 urges a ball 102 into engagement with the aligned slots 94.

As best shown in Figure 8, when the ball 102 engages an adjacent socket slot 94, the ball 101 will engage an edge of the ratchet rod 92 between adjacent teeth 93. This provides double the normal number of adjustments of the ratchet rod when moved in an endwise direction.

The outer end of the recess 91 is threaded to receive therein a plug 103 for maintaining the coil spring 100 in a position for urging the ball 102 into slotted engagement.

When this modified mechanism is substituted for the ratchet rod 56 and the trunnion assembly 46 illustrated in Figure 1, the operation is exactly as previously described herein. As shown in Figures 14 and 15, when the ratchet rod 92 is partially rotated to turn the slotted paths out of alignment with their adjacent balls, the ratchet rod is free for movement in either endwise direction.

While the ratchet assemblies illustrated and described herein provide for a spring pressed ball engaging a slot in the ratchet rod, it is to be understood that any suitable plunger arrangement may be substituted therefor.

The brake lever constructions described herein provide a swinging type of lever which is actuated by a substantially straight-pull type of ratchet rod, the latter being held in adjusted position by cooperation with a spring pressed ball or plunger and released for endwise movement by partial rotation.

While particular embodiments only of this invention have been illustrated, it will, of course, be understood that the invention should not be limited thereto, since many modifications may be made, and it is therefore contemplated by the appended claims to cover all such modifications as fall within the true spirit and scope of the present invention.

I claim as my invention:

1. An article of manufacture comprising a support member having spaced bearing portions, an apertured trunnion straddled and pivotally carried by said bearing portions of the support member, an actuating member rotatable between predetermined limits about its own longitudinal axis and slidably extending through said trunnion member and having a series of ratchet recesses therein on opposite sides thereof, and a spring pressed latching mechanism slidably carried by said trunnion member for normally operatively engaging the ratchet recesses in said actuating member and inoperatively engaging smooth areas on said actuating member between said ratchet recesses when the actuating member is rotated about its longitudinal axis.

2. A brake lever construction comprising an endwise movable brake setting member and a relatively stationary member, a tubular trunnion pivotally mounted on said stationary member for movement about an axis in transverse relation to the plane of said stationary member, said trunnion supporting said brake setting member for relative endwise movements and rotational movements about its longitudinal and transverse axes, said endwise movable member having a series of pockets disposed along opposite sides thereof, the series of pockets on one side being staggered with respect to the series of pockets on the other side, a spring pressed plunger mechanism in said trunnion and urged toward said series of pockets, said pockets being shaped to allow said plunger mechanism to slide freely out of the same when said movable member is moved in one direction and to normally prevent movement of said movable member in the opposite direction thereby to hold said movable member in adjusted brake setting position.

3. A self-contained brake lever construction arranged as an attachment for a vehicle comprising a stationary supporting member, a second member mounted on said stationary member and arranged to swing, and a third member connected to said second member and slidably supported by said stationary member, said third member being movable in substantially an endwise direction, and a ball and socket ratchet mechanism between said endwise movable member and said stationary member arranged to hold said movable members of the brake lever construction in adjusted brake setting position.

4. A brake lever construction comprising a first member arranged to swing for actuating and releasing a brake, a second member operable by substantial endwise movement for swinging said first member, said second member being pivotally connected to said first member for relative angular and limited rotative movement, resilient means operatively connecting said members for normally opposing said relative rotative movement therebetween, abutment means on said members for limiting said relative rotative movement, and a plunger mechanism normally operatively engaging said second member along a predetermined path for holding said member in adjusted position to which it is moved in an endwise direction, said plunger mechanism inoperatively engaging said second member along a different path to release said member from its adjusted held position when said member is rotated to its abutment limit.

5. A lever actuating mechanism comprising a U-shaped support having apertures through its side-walls at both ends thereof, a lever having pivotal connection through the apertures at one end of said support to swing, a ratchet rod having a plurality of socket slots arranged in a line along an edge thereof, a U-shaped bracket pivotally connecting said lever and rod for relative angular and limited rotative movement therebetween, a spring connecting said lever and rod for normally opposing said relative rotative movement, said rod having a portion arranged for abutment with said bracket for limiting said relative movement between said lever and rod, a trunnion within the sidewall apertures at the other end of said support being arranged for relative rotative movement and having flange means for restricting relative endwise movement therebetween, said trunnion having a transverse opening therethrough for receiving said ratchet rod, and a spring pressed ball carried by said trunnion and being urged into engagement with said rod, said ball normally being arranged in alignment with said socket slots for engaging a slot and holding said rod in an adjusted position to which it is moved in an endwise direction, said ball inoperatively engaging said rod along portions adjacent said slotted line for releasing said rod from its adjusted held position when it is rotated to its abutment limit.

6. A lever actuating mechanism comprising a U-shaped support having apertures through its sidewalls at both ends thereof, a lever having pivotal connection through the apertures at one end of said support to swing, a ratchet rod having socket slots arranged in a plurality of straight line paths lengthwise of said member with smooth areas therebetween, the slots of one path being arranged in staggered relation to the slots in the other paths, a U-shaped bracket pivotally connecting said lever and rod for relative angular and limited rotative movement therebetween, a spring connecting said lever and rod for normally opposing said relative rotative movement, said rod having a portion arranged for abutment with said bracket for limiting said relative rotative movement between said lever and rod, a trunnion within the sidewall apertures at the other end of said support being arranged for relative rotative movement and having flange means for restricting relative endwise movement therebetween, said trunnion having a transverse opening therethrough for receiving said ratchet rod, and spring pressed balls carried by said trunnion in alignment normally with said paths of socket slots and being urged into engagement with said rod, each of said balls engaging a slot in an adjacent path for holding said ratchet rod in an adjusted position to which it is moved in an endwise direction, said balls inoperatively engaging the smooth areas of said ratchet rod for releasing the latter from its adjusted held position when it is rotated to its abutment limit.

7. An actuating lever mechanism comprising a member arranged for swinging movement, an endwise movable member, a member embracing and connecting adjacent spaced ends of said swinging and endwise movable members, said embracing member being arranged for permitting relative pivotal angular and rotative movement between said first mentioned members, abutment means between said endwise movable member and said connecting member for limiting relative rotative movement between said first mentioned members, and resilient means operatively connecting said spaced ends of the swinging and endwise movable members for normally opposing said relative rotative movement therebetween.

8. An actuating lever mechanism comprising a lever arranged for swinging movement about one of its ends, an endwise movable rod, a bracket embracing said rod adjacent an end thereof and being pivotally connected to said lever, said bracket having a laterally extending portion and being arranged for permitting relative angular and rotative movement between said lever and said rod, an abutment on said rod for engagement with said bracket extending portion for limiting said relative rotative movement between the lever and the rod, and spring means for normally opposing said relative rotative movement.

9. An actuating lever mechanism comprising a flat lever arranged to be swung about one of its ends, an endwise movable rod having a reduced portion adjacent one end thereof, said one end of the rod having a flat surface in flush relation with an edge of said reduced portion, a U-shaped bracket having a portion embracing the reduced portion of said rod in a manner permitting relative rotative movement and restricting relative axial movement, said bracket having upstanding legs pivotally connected to said flat lever, one of said bracket legs having a transversely extending flange, said bracket connecting said flat lever and rod in a manner permitting relative angular and rotative movement therebetween, the flat surface on said rod being arranged to abut against said laterally extending bracket flange for limiting said relative rotative movement between the flat lever and rod, and a coil spring embracing said one end of the rod and having hooked engagement with said flat lever for normally opposing said relative rotative movement.

10. An actuating mechanism comprising a member arranged for movement in substantially an endwise direction and for limited movement in a rotative direction about its own axis, socket slots arranged in a plurality of straight line paths lengthwise of said member with smooth areas therebetween, a pivoted member rotatably supporting said first member for movement about a transverse axis of the first member, and a plunger mechanism in said pivoted member and radially arranged with respect to said first member for normally engaging said lines of slots for holding said first member in an adjusted position to which it is moved in an endwise direction, said plunger mechanism inoperatively engaging the smooth areas on said member for releasing it from its adjusted position when it is rotated.

11. An actuating mechanism comprising a member arranged for movement in substantially an endwise direction and for limited movement in a rotative direction about its own longitudinal axis, socket slots arranged in straight line paths on opposite sides thereof, the slots of one path being staggered with respect to the slots of the other path, a pivoted member rotatably supporting said first member for movement about a transverse axis of the first member, and a plunger mechanism in said pivoted member and radially disposed with respect to said first member for each of said lines of slots, said plunger mechanisms alternately engaging the slots adjacent thereto as said member is moved in an endwise direction.

12. An actuating mechanism comprising a member arranged for movement in substantially an endwise direction and for limited movement in a rotative direction about its longitudinal axis, socket recesses arranged in a straight line along an edge of said member, a pivotally mounted trunnion support having an opening therethrough in one direction for receiving said member and a recess extending partially therethrough in another direction and a spring pressed ball in said trunnion recess arranged for normally operatively engaging within one of said socket recesses for holding said member in an adjusted position to which it is moved when actuated in an endwise direction, said ball inoperatively engaging a portion of said member adjacent said socket recesses for releasing the member from adjusted held position when it is rotated.

13. An actuating mechanism comprising a member arranged for movement in substantially an endwise direction and for limited movement in a rotative direction about its longitudinal axis, socket recesses arranged in a straight line path along an edge of said member, a stationary U-shaped support for said member, a trunnion pivotally mounted on said support and having shoulder means limiting its endwise movement relative to the support, a ball in said trunnion normally arranged in the path of said line of recesses, and a coil spring urging said ball into engagement with one of said recesses for holding said member in an adjusted position to which it is moved when actuated in an endwise direction, the pressure exerted by said coil spring being arranged for maintaining said shoulder means against said U-shaped support for maintaining said trunnion in its mounted position, said ball inoperatively engaging a portion of said member adjacent said recesses for releasing the member from adjusted held position when it is rotated.

14. A stationary support for a movable actuating member which is arranged for movement in an endwise direction and for movement in a limited rotative direction about its longitudinal axis which comprises, a U-shaped bracket having apertured sidewalls and a connecting web, a trunnion inserted through the apertures in said bracket sidewalls and arranged for pivotal movement relative thereto, said trunnion having bisecting openings therein, one of said openings receiving the actuating member therethrough, and spring pressed plunger means within the other of said trunnion openings for operatively and inoperatively engaging the movable actuating member for limiting its endwise movement.

15. A stationary support for a movable actuating member which is arranged for movement in an endwise direction and for movement in a limited rotative direction about its longitudinal axis which comprises, a U-shaped bracket having apertured sidewalls and a connecting web, a trunnion inserted through the apertures in said bracket sidewalls and having a flange abutting against one of said sidewalls for limiting relative endwise movement and permitting relative rotative movement therebetween, said trunnion having a transverse aperture therethrough and a longitudinally extending recess, a coil spring seated within said recess, and a ball seated on said coil spring, said spring pressed ball coacting with an actuating member inserted through the transverse aperture in said trunnion for limiting its endwise movement depending upon the position to which it has been rotated.

16. A stationary support for a movable actuating member which is arranged for movement in an endwise direction and for movement in a limited rotative direction about its longitudinal axis which comprises, a U-shaped bracket having apertured sidewalls and a connecting web, a trunnion inserted through the apertures in said bracket sidewalls and arranged for pivotal movement relative to said bracket, means for tightly embracing the periphery of said trunnion and abutting against the sidewalls of said bracket for restricting endwise movement of said trunnion relative to said bracket, said trunnion having a transverse aperture therethrough and a longitudinal recess extending on both sides of said transverse aperture from one end of the trunnion into spaced relation from its other end, said transverse aperture being arranged for receiving the actuating member therethrough, a coil spring within said longitudinal recess on each side of the inserted actuating member, a ball between each coil spring and the actuating member, and removable means for closing said longitudinal recess at said one end of the trunnion, said spring pressed balls coacting with the actuating member for limiting its endwise movement depending upon the position to which it has been rotated.

17. A brake lever construction comprising relatively movable parts, one of said parts being arranged to swing and the other of said parts being arranged for rotative and endwise movements, a U-shaped member straddling and being pivotally connected to said swinging part and rotatively embracing said other part, spring means between and connected to adjacent ends of said parts, and means for holding said other part in an adjusted position to which it is moved.

18. A brake lever construction comprising a lever member pivotally connected to a support to swing, a support member having spaced side walls with registered openings therein, a trunnion member having portions pivotally mounted in said side wall openings of the support member, said trunnion member having openings therein crossing each other with one of the openings extending therethrough, a ratchet member having a row of teeth slidably extending through said one opening in said trunnion member, means connecting adjacent ends of said lever member and said ratchet member for relative pivotal and rotational movements, a clutch mechanism in the other of said trunnion openings having a portion thereof in normal alignment with said ratchet teeth, and spring means normally urging said clutch mechanism into engagement with the teeth of said ratchet member to hold the latter in an adjusted position, said clutch mechanism inoperatively engaging said ratchet member along portions adjacent said teeth for releasing the ratchet member from its adjusted position when the ratchet member is rotated to move the ratchet teeth out of alignment with said portion of said clutch mechanism.

19. A support and clutching mechanism for an endwise movable and rotatable toothed ratchet rod comprising a supporting member having spaced sidewalls with registered openings therein, a trunnion member having portions pivotally mounted in said openings, an opening through said trunnion member for slidably receiving the ratchet rod therethrough, a recess in said trunnion member extending radially on opposite sides of said opening, a clutch mechanism slidable in said recess toward and away from the ratchet rod and having a portion thereof in normal alignment with the teeth on the ratchet rod, and spring means between an end of said recess and said clutch mechanism for urging said portion thereof into engagement with the ratchet rod.

20. A lever mechanism comprising an actuating member supported for endwise movements and for rotation about a transverse axis, an actuated member arranged to swing, a bracket pivotally connected to said actuated member and embracing said actuating member whereby the latter is supported for rotation about its longitudinal axis, means defining limits of rotation of the actuating member about its longitudinal axis, spring means for normally maintaining said actuating member at one of said limits and for opposing said rotation, and clutching means operable when said actuating member is at said one limit for holding the actuating member in an adjusted position.

HERBERT S. JANDUS.